United States Patent
Ostrowski

(10) Patent No.: US 6,438,790 B1
(45) Date of Patent: Aug. 27, 2002

(54) WINDSHIELD WIPER SYSTEM

(75) Inventor: Wolfgang Ostrowski, Wolfsburg (DE)

(73) Assignee: Volkswagon AG, Wolfsburg (DE)

( * ) Notice: Subject to any disclaimer, the term of this patent is extended or adjusted under 35 U.S.C. 154(b) by 0 days.

(21) Appl. No.: 09/837,996

(22) Filed: Apr. 19, 2001

Related U.S. Application Data

(63) Continuation of application No. PCT/EP99/09244, filed on Nov. 29, 1999.

(30) Foreign Application Priority Data

Dec. 10, 1998 (DE) .......................... 198 57 080

(51) Int. Cl.[7] ................ B60S 1/06; B60S 1/24
(52) U.S. Cl. ............... 15/250.27; 15/250.31; 15/250.3; 74/42; 74/43
(58) Field of Search ............... 15/250.31, 250.3, 15/250.27, 250.14; 74/42, 43, 70, 75, 51; 384/206, 208; 403/56, 122

(56) References Cited

U.S. PATENT DOCUMENTS 4,009,502 A * 3/1977 Tamaki et al. ........... 15/250.27
5,473,955 A * 12/1995 Stinson .................... 15/250.27
5,680,792 A * 10/1997 Buhl ........................ 15/250.31

FOREIGN PATENT DOCUMENTS

DE 4220673 * 9/1993
EP 776803 * 6/1997 ............. 15/250.31

* cited by examiner

Primary Examiner—Gary K. Graham
(74) Attorney, Agent, or Firm—BakerBotts LLP

(57) ABSTRACT

A windshield wiper system for motor vehicles includes two wiper blades which rotate in the same direction and are driven by a crank linkage mechanism. The wiper system is arranged to enable independent positioning of the two wipers and which is economical and simple to install. The system uses two drive rods, one rotatably connecting the crank and a first wiper and rigidly connected to a connecting member. The end of the connecting member is rotatably connected to the second drive rod which is connected to a second wiper. The rotatable connections are preferably ball and socket connections.

4 Claims, 3 Drawing Sheets

WINDSHIELD WIPER SYSTEM

This is a continuation of copending International application No. PCT/EP99/09244 filed Nov. 29, 1999, which is incorporated by referenced herein, which has been published by the International Bureau in non-English on Jun. 15, 2000.

BACKGROUND OF THE INVENTION

The invention relates to a windshield wiper system for motor vehicles, comprising two wiper blades which rotate in the same direction and which are driven by means of a crank linkage mechanism.

A windshield wiper system at the front or rear window of motor vehicles comprising two wiper blades that rotate simultaneously and in opposite directions, which are arranged displaced with respect to one another and which are driven by means of a crank linkage mechanism, is disclosed in DE 4,220,673. In the windshield wiper system, an eccentric pin is arranged at the free end of a crank driven by a motor in such a way that in the starting position of the wipers the drive center of the motor forms a straight line with the center of the eccentric pin connected articulated to the crank rod and with the center of the crank rod/wiper arm linkage on the one hand and, on the other hand, with the center of the crank/crank rod linkage and with the centers of the crank rod/elbow lever linkage.

In such a windshield wiper system, however, the position of the drive circuit is established by the two wipers. The arrangement of the drive motor is therefore predetermined within narrow limits, so that installation of the windshield wiper system in the vehicle may lead to conflicts with the arrangement of other units under the windshield of the vehicle. Independent positioning of the wipers would only be possible with two separate drive motors, which, however, would result in greater complexity and cost.

The object of the invention is to provide a windshield wiper system in which the position of the wipers can be independently selected, wherein the wipers can be placed in almost any axial position, and which is economical and simple to install.

SUMMARY OF THE INVENTION

The invention is based on the idea of providing an operating rod which is connected to produce a drive path different from that of the wiper motor and which serves as drive member for at least one additional operating rod. The windshield wiper system for vehicles according to the invention, comprising two wiper blades which rotate in the same direction and which are driven by means of a crank linkage mechanism. A connecting member is rotatably connected to the crank at a first fastening point of the connecting member. A first drive rod is rigidly connected to the connecting member at the first fastening point and connected to drive a first wiper. A second drive rod is rotatably connected to the connecting member at a second fastening point, which is located remote from the first fastening points and connected to drive a second wiper.

The crank of the motor and the connecting member and first drive rod preferably are connected together by means of a ball and socket joint, where a ball is solidly connected to the drive rod in such a way as to be located to the side of the drive rod, and a ball socket for receiving the ball is built into the crank. Likewise, the connection between the second drive rod and the connecting member preferably includes a ball on the side of the second drive rod and a socket on the connecting member.

An advantage of the windshield wiper system according to the invention is that it is simple in design and can be placed in almost any position.

Additional features and advantages of the invention appear in the following description of preferred embodiments of the invention, reference being made to the accompanying drawings.

DESCRIPTION OF THE INVENTION

Figure 1:
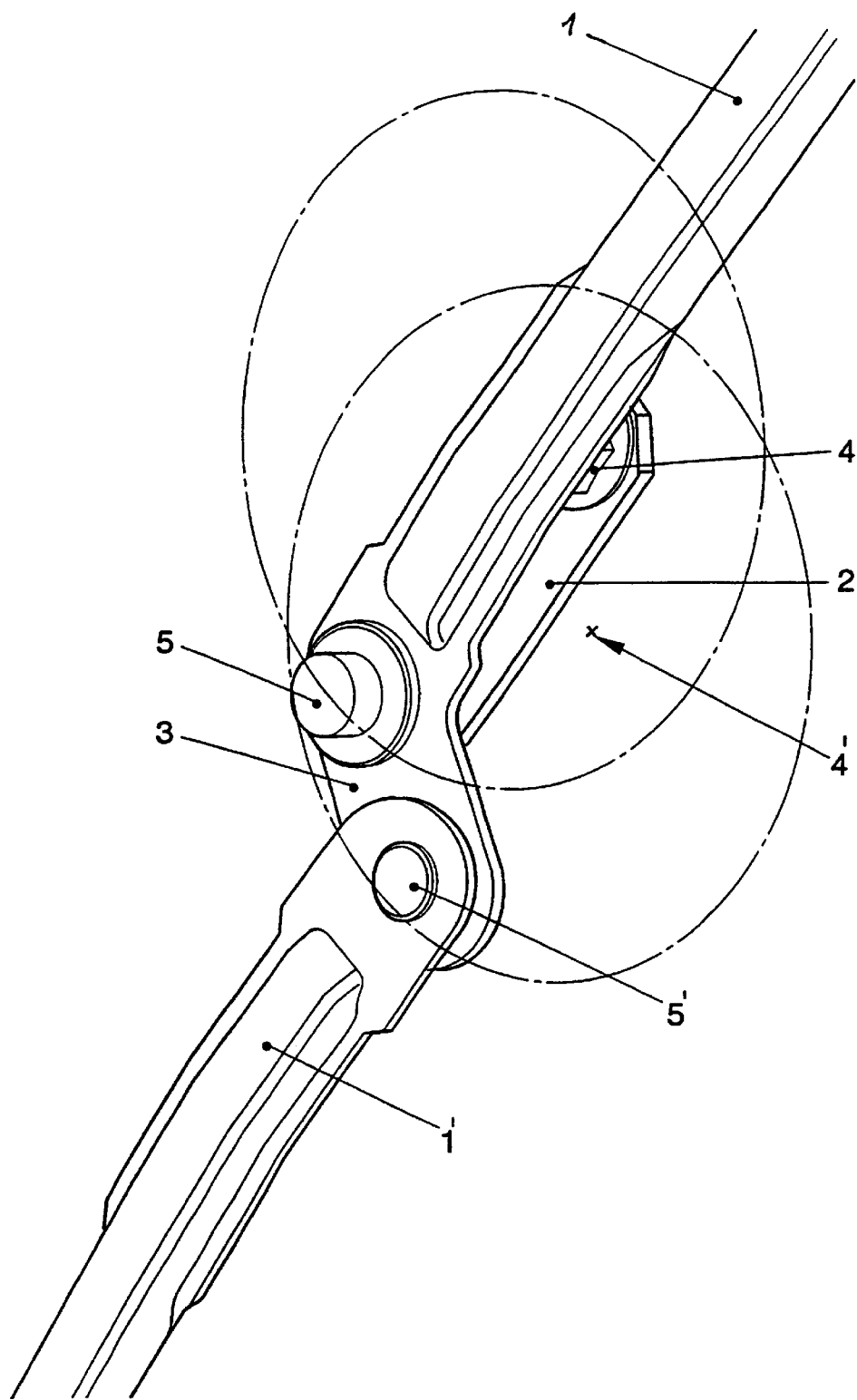
FIG. 1 shows an embodiment of the windshield wiper system according to the invention in perspective view.

FIG. 1 is a schematic perspective view of a windshield wiper system for motor vehicles comprising two wiper blades rotating in the same direction. The wiper blades are driven by means of a crank linkage mechanism. To this end, they are each connected by means of a first drive rod 1 and second drive rod 1' with a crank 2 of the drive motor. The crank 2 may be a simple crank, as shown, or a circular disk. In the wiper system according to the invention a connecting member 3 is provided which connects each drive rod and the crank of the drive motor. The connecting member 3 is rotatably connected to the crank 2 at a first fastening point 5 at one end of the connecting member 3. In addition, the first drive rod 1 is solidly fastened to the connecting member 3 at the first fastening point 5 and may, as shown, be formed as a single piece therewith. The second drive rod 1' is rotatably connected to the connecting member 3 at a second fastening point 5'. The second fastening point 5' is located at the free end of the connecting member 3 remote from the first fastening point 5.

When the drive motor rotates crank 2, the first fastening point 5 describes a circle whose center 4 forms the motor axis. In contrast, the second fastening point 5' describes a circle whose center 4' is displaced with respect to the first center 4. The system according to the invention converts the circular motion of the drive motor and crank 2 into two circular motions with a first and a second circle centers 4 and 4', without the drive linkage of the wiper system being blocked in any position. Thus, the axes of the two drive circles and, therefore, the position of the wipers as well, are independent of one another.

Figure 2A:
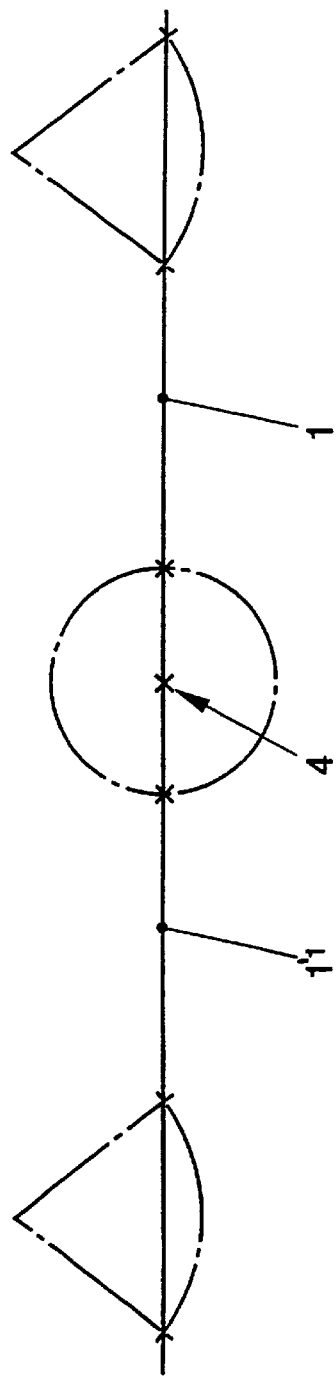
FIGS. 2a and 2b show the essential lines of motion of a windshield wiper system having two wipers according to the prior art and according to the invention.
Figure 2B:
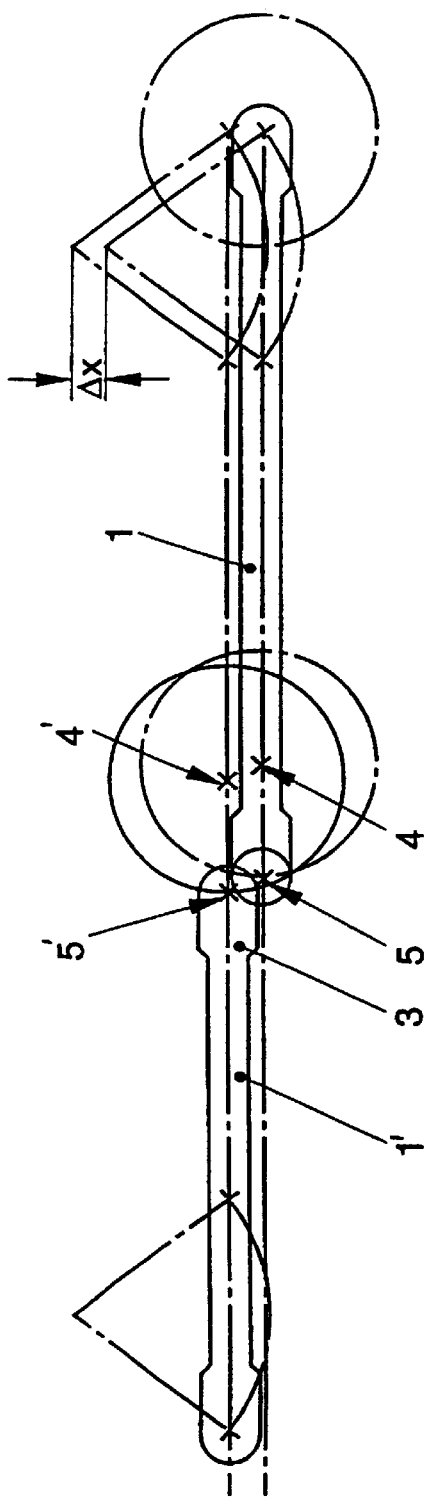

The difference between the prior art and the invention can be seen from the comparison of FIG. 2A with FIG. 2B. The relative arrangement to one another of the drive circle, the first wiper and the second wiper according to the prior art is shown in FIG. 2A. As is apparent in FIG. 2A, the two wipers and the drive circuit lie on a line. A change in position is possible only by rotation about the center of the drive circuit. Unlike positioning of the two wipers in vertical direction to one another is not possible. (Here, "vertical" direction means the direction perpendicular to the connecting line of the two wipers.)

In the windshield wiper system according to the invention, unlike positioning of the two wipers in vertical direction to one another is obtained by the connecting member 3 according to the invention. As shown in FIG. 2B, displacement of one of the wipers (the right wiper in FIG.

2B) by Δx is made possible in that the first drive rod 1 is connected directly at a fastening point 5 to the crank 2 and the second drive rod 1' is connected by means of the connecting member 3 to the crank 2. The fastening points 5 and 5' describe circles displaced with respect to one another, i.e., circles with the two non-identical centers 4 and 4'. The fact that the centers 4 and 4' of the drive circuits are separated from one another in the vertical direction results in the desired displacement of the two wipers in vertical direction.

Figure 3:
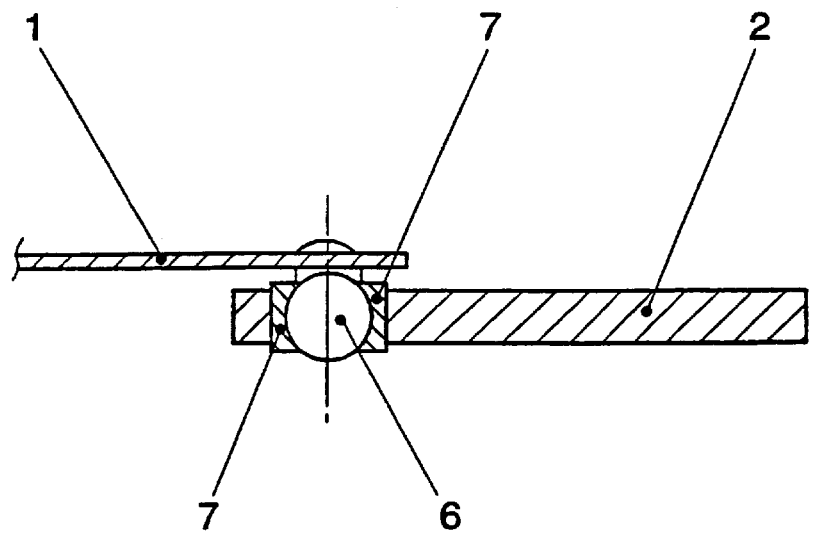
FIG. 3 shows a cross-sectional view of a ball and socket connection useful in a preferred embodiment of the invention.

An embodiment of the articulated connection between crank 2 and drive rod 1 at the fastening point 1 is shown in cross section in FIG. 3. In order to obtain as small as possible an overall height of the connection between the drive rod 1 and the crank 2, the crank 2 of the motor and the drive rod 1 preferably are connected together by means of a ball and socket joint. The ball and socket joint comprises a ball 6 and a ball socket 7. According to the invention, the ball 6 is solidly connected to the drive rod 1 in such a way as to be located to the side of the drive rod 1. The ball socket 7 for receiving the ball 6 is built into the crank 2. The drive rod 1' is fastened to the connecting member 3 in similar fashion.

While there has been described what is believed to be the preferred embodiment of the present invention, those skilled in the art will recognize that other and further changes and modifications may be made thereto without departing from the spirit of the invention, and it is intended to claim all such changes and modifications as fall within the true scope of the invention.

I claim:

1. A windshield wiper system for a motor vehicle comprising:

a motor;

a crank driven by said motor;

first and second wiper blades;

a connecting member rotatably connected to said crank at a first fastening point;

a first drive rod rigidly connected to said connecting member at said first fastening point and connected to drive said first wiper blade; and a second drive rod rotatably connected to said connecting member at a second fastening point remote from said first fastening point and connected to drive said second wiper.

2. A windshield wiper according to claim 1 wherein said crank is connected to said connecting member and said first drive rod at said first fastening point by a ball and socket joint, wherein a ball is solidly connected to said connecting member and said first drive rod on a side thereof and a ball socket for receiving said ball is carried by said crank.

3. A windshield wiper according to claim 2 wherein said connecting member is connected to said second drive rod at said second fastening point by a ball and socket joint, wherein a ball is solidly connected to said second drive rod on a side thereof and a ball socket for receiving said ball is carried by said connecting member.

4. A windshield wiper according to claim 1 wherein said connecting member is connected to said second drive rod at said second fastening point by a ball and socket joint, wherein a ball is solidly connected to said second drive rod on a side thereof and a ball socket for receiving said ball is carried by said connecting member.

* * * * *